US012725357B2

(12) United States Patent
Crespi et al.

(10) Patent No.: US 12,725,357 B2
(45) Date of Patent: Sep. 1, 2026

(54) METHOD AND SYSTEM FOR GENERATING ANONYMIZED DIGITAL HUMANS

(71) Applicant: Unity Technologies SF, San Francisco, CA (US)

(72) Inventors: Adam Richard Crespi, Kirkland, WA (US); Charles Levi Metze, III, Washington, DC (US); Cera Kayli Laidlaw, Redmond, WA (US); James Neilson Warren, Seattle, WA (US); River Indie Page, Casselberry, FL (US); Cameron Sun, Seattle, WA (US); Alex Thaman, Woodinville, WA (US)

(73) Assignee: Unity Technologies SF, San Francisco, CA (US)

( * ) Notice: Subject to any disclaimer, the term of this patent is extended or adjusted under 35 U.S.C. 154(b) by 213 days.

(21) Appl. No.: 18/241,211

(22) Filed: Aug. 31, 2023

(65) Prior Publication Data

US 2024/0070983 A1 Feb. 29, 2024

Related U.S. Application Data

(60) Provisional application No. 63/402,947, filed on Aug. 31, 2022.

(51) Int. Cl.

| | |
|---|---|
| ***A63F 13/55*** | (2014.01) |
| ***A63F 13/58*** | (2014.01) |
| ***A63F 13/63*** | (2014.01) |
| ***A63F 13/655*** | (2014.01) |
| ***G06T 13/40*** | (2011.01) |
| ***G06T 15/04*** | (2011.01) |
| ***G06T 17/00*** | (2006.01) |
| ***G06T 17/20*** | (2006.01) |

(52) U.S. Cl.

CPC .................................... *G06T 17/20* (2013.01)

(58) Field of Classification Search

CPC ..... G06T 17/20; G06T 15/04; G06T 2210/16; G06T 17/00; G06T 13/40; A63F 15/55; A63F 13/58; A63F 13/63; A63F 13/655

See application file for complete search history.

(56) References Cited

U.S. PATENT DOCUMENTS

| | | | | |
|---|---|---|---|---|
| 9,978,175 | B2 * | 5/2018 | Corazza | G06T 13/40 |
| 12,086,931 | B2 * | 9/2024 | Miao | G06T 15/04 |
| 2016/0117865 | A1 * | 4/2016 | Nair | A63F 13/63 345/419 |

(Continued)

OTHER PUBLICATIONS

Zhang, Rongxue. "Three-Dimensional Animation Space Design Based on Virtual Reality." Scientific Programming 2022.1 (2022): 6559155. (Year: 2022).*

*Primary Examiner* — Xiao M Wu
*Assistant Examiner* — George Renze
(74) *Attorney, Agent, or Firm* — Schwegman Lundberg & Woessner, P.A.

(57) ABSTRACT

A method of populating a digital environment with an anonymous humanoid digital character is disclosed. One or more values are randomly determined for one or more target human properties. An asset pool is searched for assets that are compatible with the one or more values. The assets include a human body mesh. A blend of height and weight vertex animation textures (VATs) is applied to the human body mesh. The blended human body mesh is placed into the digital environment.

20 Claims, 13 Drawing Sheets

(56) References Cited

U.S. PATENT DOCUMENTS

| | | | | |
|---|---|---|---|---|
| 2022/0166955 | A1* | 5/2022 | Gronau | G06T 15/04 |
| 2022/0207116 | A1* | 6/2022 | Ok | G06T 13/40 |
| 2023/0154111 | A1* | 5/2023 | Khakhulin | G06N 3/0464<br>345/420 |
| 2024/0029358 | A1* | 1/2024 | Sharma | G06T 17/205 |

* cited by examiner

Figure 6:
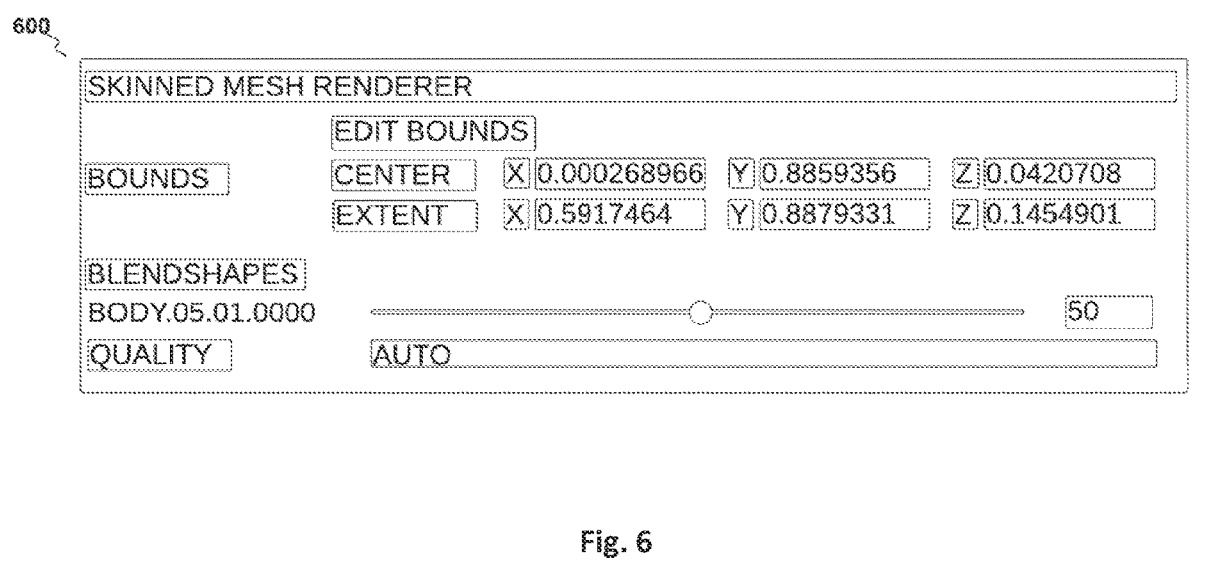

600

SKINNED MESH RENDERER

EDIT BOUNDS

BOUNDS CENTER X 0.000268966 Y 0.8859356 Z 0.0420708

EXTENT X 0.5917464 Y 0.8879331 Z 0.1454901

BLENDSHAPES

BODY.05.01.0000 50

QUALITY AUTO

| 1 | 2 | 3 |
| --- | --- | --- |
| 4 | 5 | 6 |
| 7 | 8 | 9 |

Fig. 7

METHOD AND SYSTEM FOR GENERATING ANONYMIZED DIGITAL HUMANS

CROSS REFERENCE TO RELATED APPLICATIONS

This application claims the benefit of U.S. Provisional Application No. 63/402,947, filed Aug. 31, 2022, which is incorporated by reference herein in its entirety.

TECHNICAL FIELD

The subject matter disclosed herein generally relates to the technical field of computer graphics, and in one specific example, to computer systems and methods for creating anonymized digital humans in a digital environment.

BACKGROUND

Blend shapes are used in 3D animation to interpolate between different sets of geometry. For instance, blend shapes may be used in facial animation to transition between expressions—like a character breaking into a smile or a frown from a neutral expression.

A specialized renderer component, such as a skinned mesh render component, of a mesh object (e.g., a collection of data that describes a shape) may be provided by an engine (e.g., the Unity game engine) and may be configured to render deformable meshes, such as skinned meshes, in real time.

However, depending on how the deformable meshes are stored and/or processed, the rendering of the deformable meshes by the engine can be computationally heavy and/or require large amounts of memory, including storage and processing of files containing redundant or otherwise unnecessary information.

BRIEF DESCRIPTION OF THE DRAWINGS

Features and advantages of example embodiments of the present disclosure will become apparent from the following detailed description, taken in combination with the appended drawings, in which:

FIG. 6 is an illustration of an example user interface for configuring a Skinned Mesh Renderer, in accordance with an embodiment;

FIG. 7 is an illustration of an example vertex mapping 700, in accordance with an embodiment;

DETAILED DESCRIPTION

Figure 1:
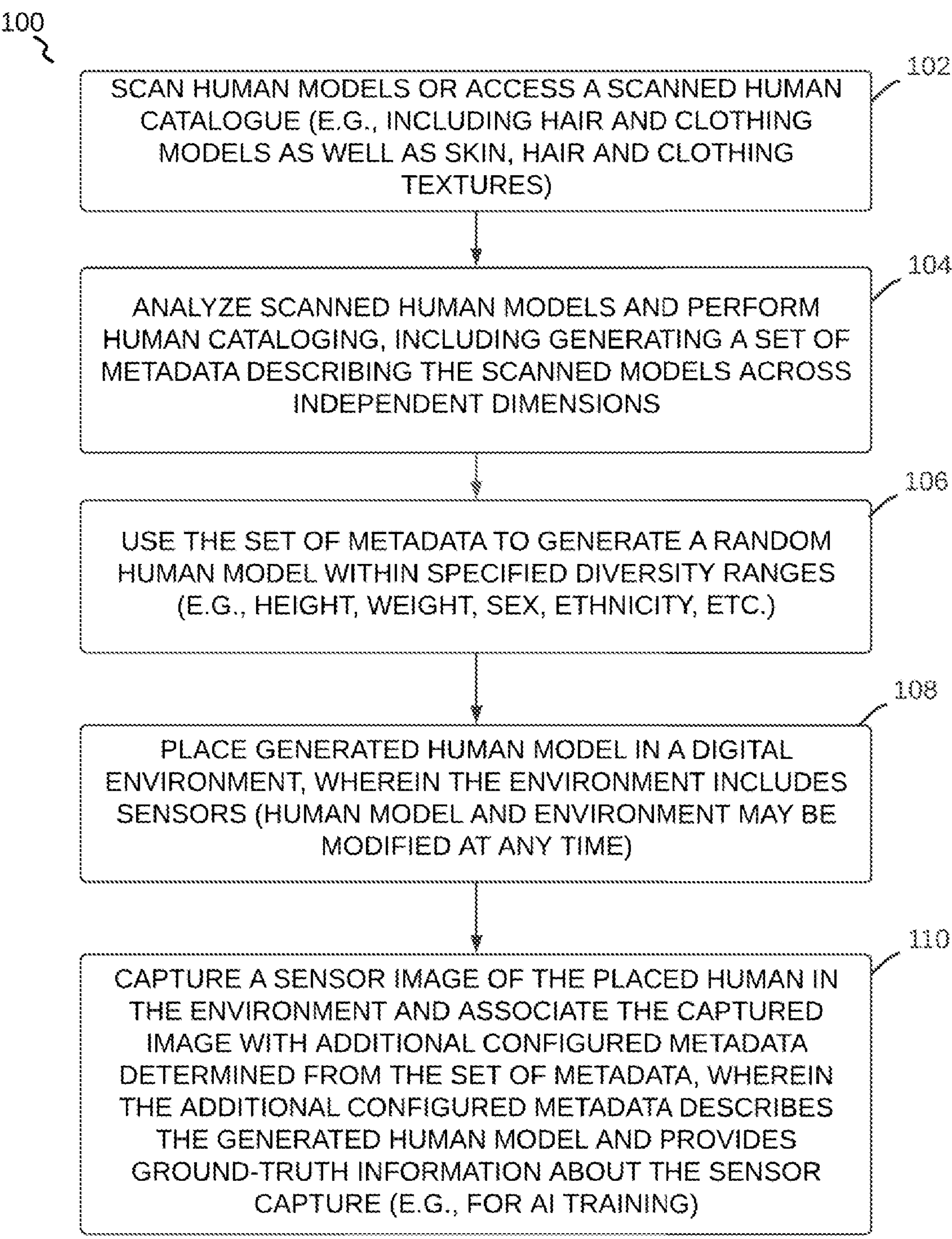
FIG. 1 is a schematic illustrating a flowchart for a method for generating anonymized digital humans in a digital environment, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

Providing and/or configuring blend shapes for use with a specialized rendering component of a mesh object supported by an engine (e.g., Unity) may be one way to configure the engine to render deformable meshes in real time. In example embodiments, each blend shape may be a completely separate mesh for each animation pose that cannot be handled by the basic rigging and skinning of the original mesh. In example embodiments, the engine may blend these meshes and the original one together between 0 and 100 in the manner of a lerp function in an animation.

For example, depicted in FIG. 6 is a user interface 600 for configuring a Skinned Mesh Renderer component of a mesh with a Blend Shape included with the original mesh. The user interface 600 includes a slider for setting a value for the blend shapes between a range of values (e.g., between 0 and 100).

In example embodiments, one or more blend shapes may be corrective blend shapes for mesh deformations not working well on a base rig. For example, when arms fold, the muscles and elbow volumes may not be well-preserved without blend shapes, even if the original T-Pose body was strongly anatomically correct and the rigger/skinner did great work. To solve this, the original T-pose body mesh could be configured to be blended to the same body mesh, but with its arm fully folded and manually sculpted to be anatomically correct.

In example embodiments, in a non-procedural environment, blend shapes may be made in a digital content creation (DCC) application with the original mesh and exported with the original mesh as blend shapes associated with the original mesh.

In example embodiments, one file (e.g., a file having a type associated with meshes, such as a RenderMan (RIB), .OBJ, or .FBX file) may contain all of the different meshes. However, in a very procedural environment, following this workflow would mean having to reexport this file each time a new blend shape is added. However, consider an environment having many unique digital human objects to be rendered. Blending thousands of body parts, such as heads, into one file may not be viable. One solution may be to get the deformable meshes directly in a palette package and implement them directly in the engine instead of having them automatically imported as such in a specialized renderer associated with the mesh.

However, this solution may result in a lot of files accumulating in Palette objects and increasing the memory taken. In fact, in example embodiments, such a workflow for blend shapes may imply a need to store all the different body and head meshes, each in their own file. If these files are of one of the mesh file types, storage requirements for each body matrix could be large (e.g., around 3500 KB).

Vertex Animation Texture (VAT) is a compression format consisting of baking animations into a texture map for later use, from a digital content creation (DCC) application (e.g., Houdini) to an engine (e.g., Unity). In example embodiments, VAT compresses mesh vertices' delta (difference between) positions between frames/poses poses and normals under RGBA values in an image format. In example embodiments, VAT compressions may be transformed into a texture.

In example embodiments, VAT may compress animation frames in a matrix format. Rows of pixels may correspond to a frame number and/or columns of pixels may correspond to a vertex ID. Each vertex's position may be determined in its corresponding RGB vector values on the texture: Vector3 (x, y, z) ? Vector3(r, g, b).

In example embodiments, VAT may be applied to a soft deformation case—e.g., a digital human's mesh topology may not change between different heights and weights (and may always have a same number of vertices) and digital humans (plus clothes) may be considered as technically falling under a soft-bodies category.

In example embodiments, VATs may not be counted as the mesh moving to the engine, so the mesh may be registered as if it has never budged and stayed static. In example embodiments, this means a whole animation from a VAT may be playing on a Static Mesh in the engine.

In example embodiments, the texture formatting may be a bit different. For example, the engine may not have multi-frame animations to export from a DCC application. Instead, the engine may be configured to morph digital humans between a shape A (e.g., Female Average Height/Weight) and a shape B (e.g., Female Short Height High Weight) for Height/Weight diversity. In example embodiments, the engine may be configured to implement morphing as if there was only one frame going from shape A to shape B. In example embodiments, the engine would only need the delta coordinates in x, y, z to go from point A to point B.

In example embodiments, the engine may also be configured to not need to store the meshes' normals. Instead, the engine may be configured to store only the delta positions of the vertices. Hence, in example embodiments, nothing is stored in the Alpha channel. In conclusion, for digital human blending to work in the engine, the engine may be configured to solely need the delta/difference between the vertices' position on shape A and the vertices' position on shape B (e.g., as stored in a VAT's RGB channels).

In example embodiments, a VAT object supported by the engine may have one or more of the following characteristics:

(1) Each pixel corresponds to a vertex ID, all ordered from left to right and from top to bottom, as shown in FIG. 7.

(2) An ideal squaring size. For example, for body meshes having 34259 vertices in a Body Matrix, the ideal "squaring" size of the texture may correspond to 186×185 pixels. In example embodiments, the remaining pixels (e.g., alias vertices) after 34259 to attain the end of the last row of pixels in the texture may not assigned to any vertices and are just fillers.

(3) For compatibility, VATs for certain parts (e.g., Heads VATs) may use the exact same pixels/vertices ordering and texture size. Hence, only the vertices corresponding to the head part may have an actual information stored; the rest are fillers.

(4) They may have a pre-determined (e.g., a 32-bit) precision (e.g., for .EXR formats), meaning that the engine may have a precision of up to a certain number of decimals (e.g., 4 decimals) on floats.

(5) The delta position values stored in the RGB channels may be fitted (e.g., between 0 and 1) based on the actual minimum and maximum delta positions of the vertices (e.g., minDelta=−0.12 m=>0.0? and maxDelta=0.25 m=>1.0)

(6) A particular Body Matrix may have a certain number of body types (e.g., 9 body types) for Females and a certain number of body types (e.g., 9 body types) for Males. At the center of this Matrix, as our "base" meshes, the engine may determine the Female and Male Average Height/Weight. The engine may take these two as the Shape A (starting point) for the rest of the other body types (Shape B) per gender. To sum it up, the VATs may correspond to blending information respectively between Female/Male Average Height/Weight to Female/Male ** Height ** Weight.

(7) The same may go for the parts VATs, such as Heads VATs. For example, they may have a base Female/Male Head as a starting point and all blend from them.

VATs may come into the engine with one or more of the following:

(1) their corresponding exported metadata; e.g., formatted as follows—(e.g., one .JSON for each VAT):

```
{
"age": 5,
"element": 1,
"filetype": 3,
"gender"; 2,
"height": 2,
"vatmax": 0.0,
"vatmin": 0.0,
"weight": 2
}
```

(2) their corresponding base mesh (e.g., Female and Male Average Height/Weight), having a second UV map (UV2) with the mesh's vertices from the original UV1 map, that were translated to their corresponding pixel position on the VAT matrix, acting as a lookup table. In example embodiments, this may be needed because the Texel density is different based on Texture size, and the engine may need it to correctly assign each corresponding vertex delta position on the Texture—(e.g., one .FBX for each base mesh and not per VAT).

In contrast, a VAT corresponding to each body type (e.g., in an .EXR file) may be only around 400 KB, and only 1 KB may be added for its corresponding JSON metadata file. Therefore, in example embodiments, the engine may reduce file size by almost 90% and may save a lot of memory in this way. Furthermore, it may be less heavy for the engine to process and the system may only get the information that it really needs, versus a mesh file (e.g., an .FBX file) coming with a lot of extra unnecessary/redundant information.

In example embodiments, the engine only needs a base body mesh (e.g., an .FBX file) for each gender (e.g., and the same may apply for other objects, such as clothes or hair) and the rest of the blending may all be encoded to VATs.

Thus, VATs may be used as another way of storing blend shapes information, keeping only the necessary information in an efficient and lighter way for the engine to process faster.

Other files, such as .JSON files, may also be a good alternative to mesh files, and the engine may be configured to use them instead of or in addition to VATs. However, in example embodiments, VATs may be chosen first based on speed of initial processing (e.g., by a GPU with a ShaderGraph).

In example embodiments, because Perception Bounding Boxes are processed before ShaderGraph is, they may be bounded by the original body instead of the blended body. So, in example embodiments, the engine may be configured to go back to a CPU-based C #script for VATs, and this could put VATs and JSONs to a very close efficiency match. In example embodiments, the engine may be configured to use VATs and JSONs alone or in combination to minimize memory usage and/or maximize processing speed.

Figure 8:
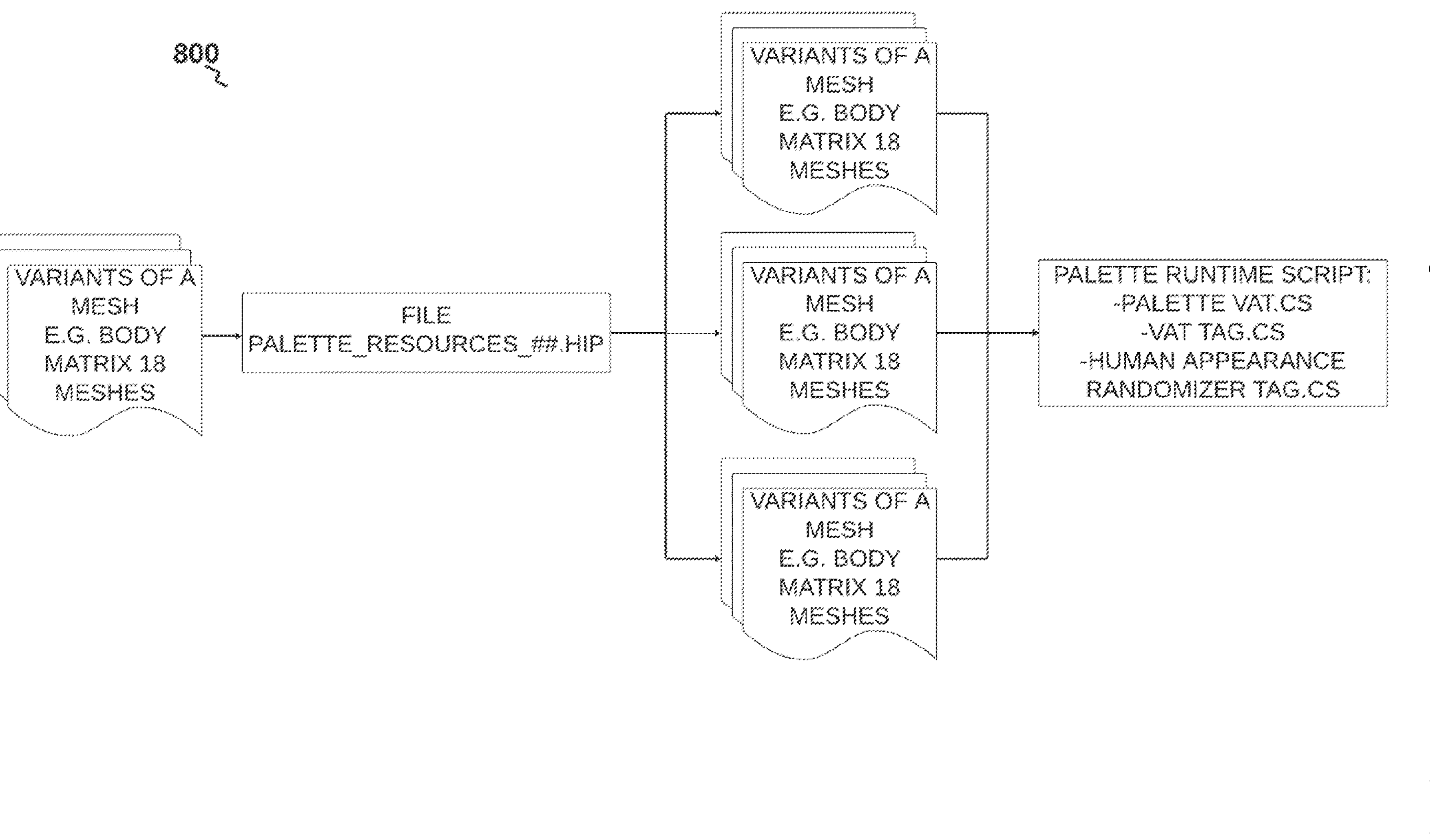
FIG. 8 is a schematic illustration of an example simplified pipeline overview 800, in accordance with an embodiment.

An example simplified pipeline overview is shown in FIG. 8, wherein VATs may be used as a kind of codex. The engine may be configured to first compress/encode the needed information from a DCC application (e.g., Houdini) into an encoded texture and metadata, which becomes an intermediary state, then the engine may decode it and read the information stored.

VATs generation in the DCC may be part of complex TOP networks with multiple instances of VEX coding. The global principle is that the engine or associated tools may be fed all the variants of a mesh type, get them procedurally processed through a TOP network to extract their delta positions from their base mesh, and then export all the necessary information into one or more of 3 types of files: .EXR, .JSON, and .FBX.

Here's an example pipeline for the case of the Body Matrix meshes for Height/Weight Diversity:

(1) Import all 18 .FBX meshes into a DCC application (e.g., Houdini);

(2) Identify the base meshes which are the Female/Male Average Height/Weight;

(3) Calculate the delta positions of all vertices respectively between the Female/Male variant and Female/Male Average Height/Weight;

(4) Encode them into the VAT RGB channels;

(5) Export 18 VATs .EXR files;

(6) Export 18 metadata .JSON files;

(7) Export 2 base meshes .FBX with a UV2 map; and (8) Read and decode the information stored with Unity Palette scripts.

The same general pipeline may then be applied to clothes, each variant fitted to each body type.

In example embodiments, a method of populating a digital environment with an anonymous humanoid digital character is disclosed. One or more values are randomly determined for one or more target human properties. An asset pool is searched for assets that are compatible with the one or more values. The assets include a human body mesh. A blend of height and weight vertex animation textures (VATs) is applied to the human body mesh. The blended human body mesh is placed into the digital environment.

The present disclosure includes apparatuses which perform one or more operations or one or more combinations of operations described herein, including data processing systems which perform these operations and computer readable media which when executed on data processing systems cause the systems to perform these operations, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits for improving computing efficiency with respect to rendering of deformable meshes in real time, including reducing memory requirements and/or improving processing speed required to implement the rendering in real time.

Turning now to the drawings, systems, and methods, including non-routine or unconventional components or operations, or combinations of such components or operations, for rendering deformable meshes in real time in accordance with embodiments of the disclosure are illustrated. In example embodiments, FIG. 1 is a schematic illustrating a flowchart for a method 100 for generating anonymized digital humans in a digital environment, in accordance with one or more example embodiments.

At operation 102, human models (e.g., human beings are scanned or a scanned human catalogue is accessed. The scanned human catalogue may include data from previously scanned humans. In accordance with an embodiment, human models may be scanned by a studio that performs real human scanning. As part of operation 100 and shown in FIG. 5A, FIG. 5B, and FIG. 5C, the scan topology may be modified to a pallet pipeline topology. In an example embodiment, the modification may include an adjustment of the scan data to fit a predetermined data schema for the pallet pipeline topology (e.g., modification of the number of vertices within a scan data, and modification of the order of vertices within scan data to fit a schema).

Figure 5A:
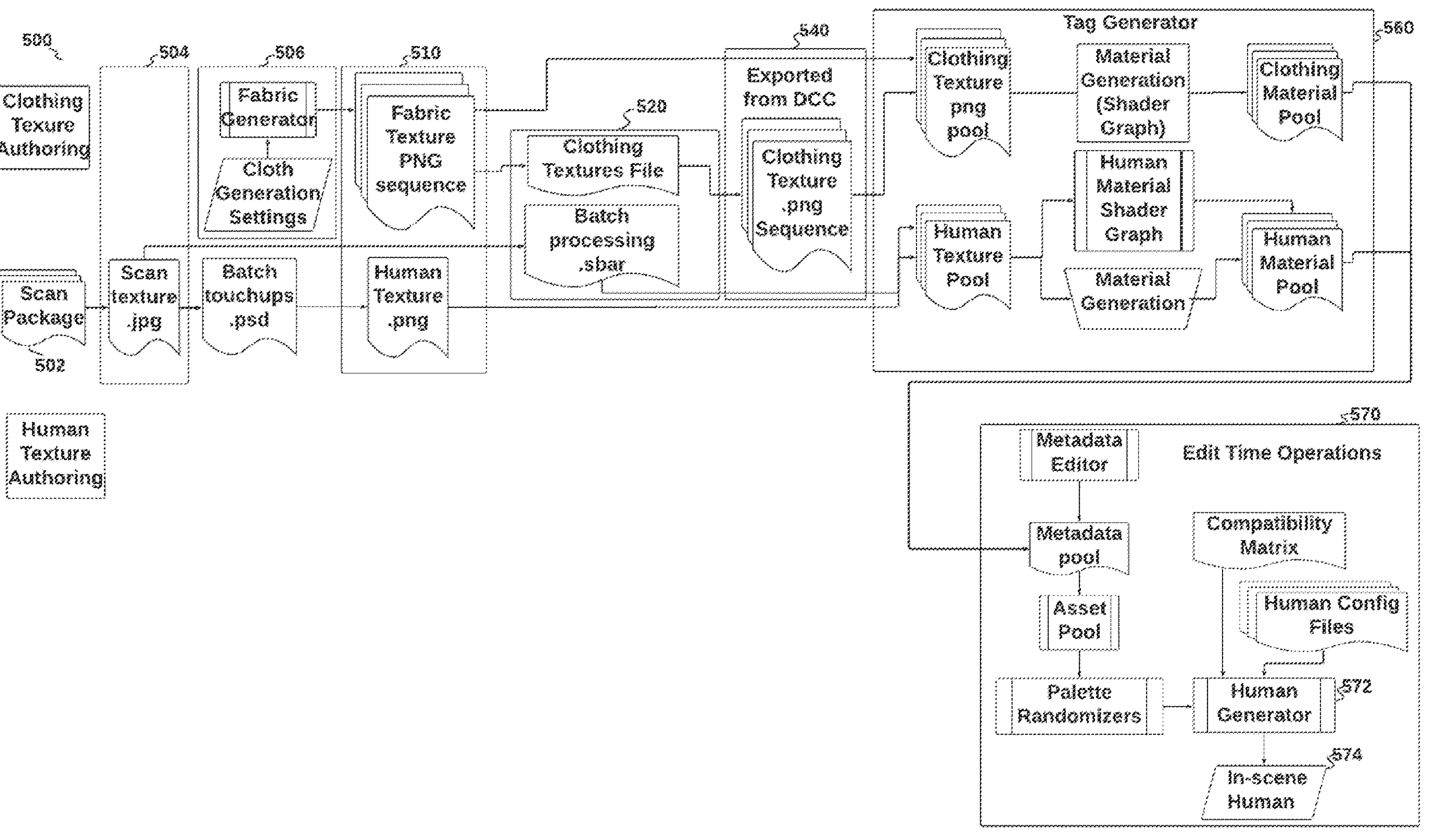
FIG. 5A is a schematic illustrating an example palette pipeline for clothing and human texture authoring, in accordance with an embodiment.
Figure 5B:
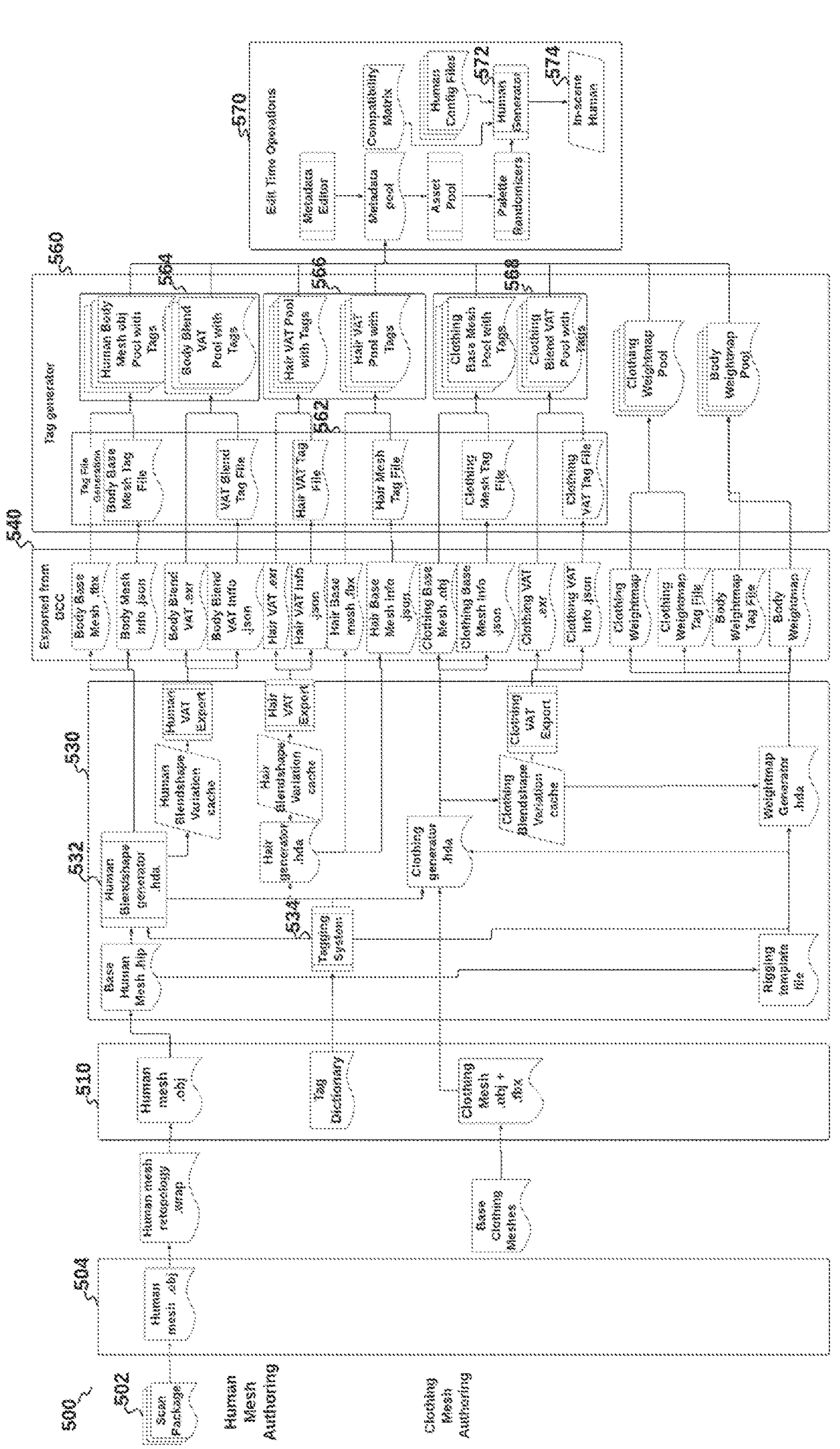
FIG. 5B is a schematic illustrating an example palette pipeline for human and clothing mesh authoring, in accordance with an embodiment.
Figure 5C:
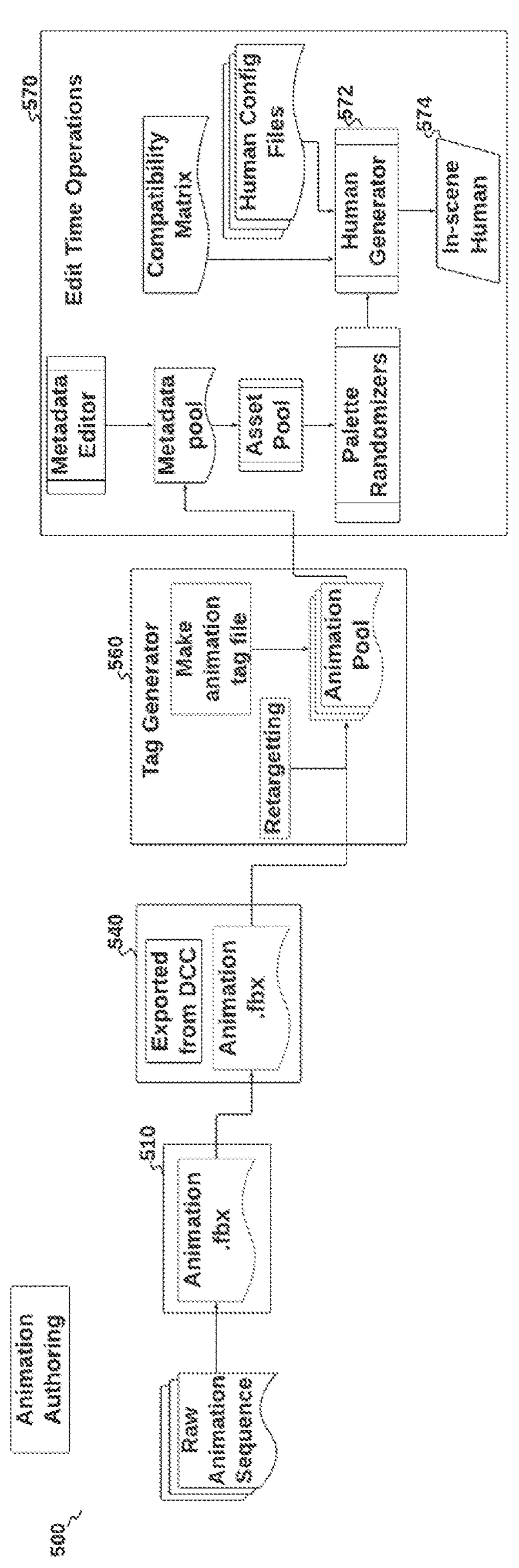
FIG. 5C is a schematic illustrating an example palette pipeline for animation authoring, in accordance with an embodiment.

At operation 104, the scanned human models are analyzed and human cataloging is performed. As shown in FIG. 5A, FIG. 5B, and FIG. 5C, the scanned human models may be imported into a pipeline and produce a set of metadata that describes the model in high detail. In addition, hair models, skin textures, and clothing may be brought through the pallet pipeline to prepare for being assembled. A data model may be used to capture all of the information needed to assemble a digital human across independent dimensions and to blend across these dimensions as desired.

At operation 106, a set of metadata is used to generate a random human model within specified diversity ranges. In accordance with an embodiment (and as further shown in FIG. 5A, FIG. 5B, and FIG. 5C), a human generation system may be configured to generate humans according to diversity ranges. When requested, the human generation system may create a random human that is a) shape blended across the collection of scanned body shapes for a particular ethnicity b) height/weight adjusted according to a sampled height/weight from a range c) textured with a sampled procedural texture that matches the ranges of skin tones for this ethnicity d) attached hair that is groomed and dynamically sized to match the head e) clothed by a sizing system that matches the clothing to the body shape f) rigged. The resulting 3D human model is ready for animation and rendering, similar to any imported rigged 3D human model, but completely anonymized at this point from a base scan due to the disassembly and re-blending.

At operation 108, a generated human model is placed in a digital environment. The digital environment may represent any indoor (e.g., home) or outdoor space (e.g., street scene). In accordance with an embodiment, the placement within the digital environment may be done according to configurable settings (e.g., via a script and/or configuration) and may include using the data within the generated human model to integrate the placed human model within the environment (e.g., taking into consideration the height/weight and clothing).

At operation 110, a sensor image of the placed generated human model is captured in the digital environment. The sensor image may be generated from a virtual camera placed within the digital environment (e.g., whereby a frustum view of the virtual camera captures the placed generated human model). The captured image is associated with additional configured metadata which may include data determined from the set of metadata as well as additional metadata describing the digital environment and the virtual camera. The additional configured metadata describes the generated human model as well as its positioning and orientation within the environment along with other aspects of the placement. The additional configured metadata associated with the captured image may provide ground-truth information about the sensor capture for AI training.

Figure 2:
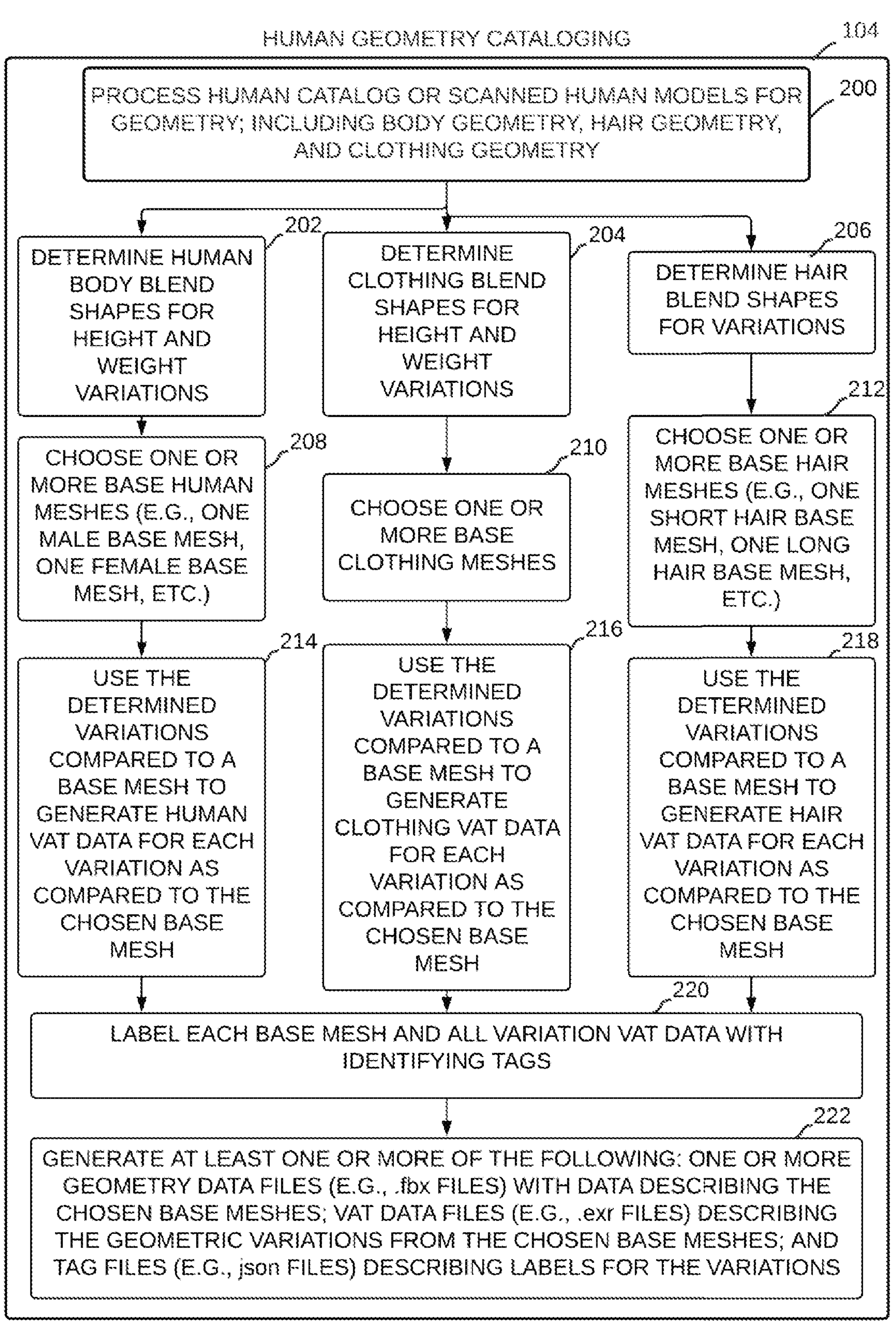
FIG. 2 is a schematic illustrating a flowchart for a method for human geometry cataloging, in accordance with one embodiment.

FIG. 2 is a schematic illustrating a flowchart for a method for human geometry cataloging, in accordance with one or more example embodiments. In accordance with an embodiment, the human geometry cataloging may include cataloging of geometry of a humanoid digital character along with cataloging of geometry of humanoid clothing, hair, heads, and more. In accordance with an embodiment, the operations shown in FIG. 2 are included as part of human cataloging in operation 104 of FIG. 1.

At operation 200, a human catalog or scanned human models are processed for geometry, such as for body geometry, hair geometry, and/or clothing geometry.

At operation 202, human body blend shapes for height and weight variations are determined.

At operation 204, clothing blend shapes for height and weight variations are determined.

At operation 206, hair blend shapes for variations are determined.

At operation 208, one or more base human meshes are chosen.

At operation 210 one or more base clothing meshes are chosen

At operation 212, one or more base hair meshes are chosen.

At operation 214, human VAT data is generated for each variation compared to a chosen base mesh.

At operation 216, clothing VAT data is generated for each variation as compared to a chosen base mesh.

At operation 218, hair VAT data is generated for each variation as compared to a chosen base mesh.

At operation 220, each base mesh and all variation VAT data is labeled with identifying tags.

At operation 222, one or more data files and/or tag files are generated.

Figure 3:
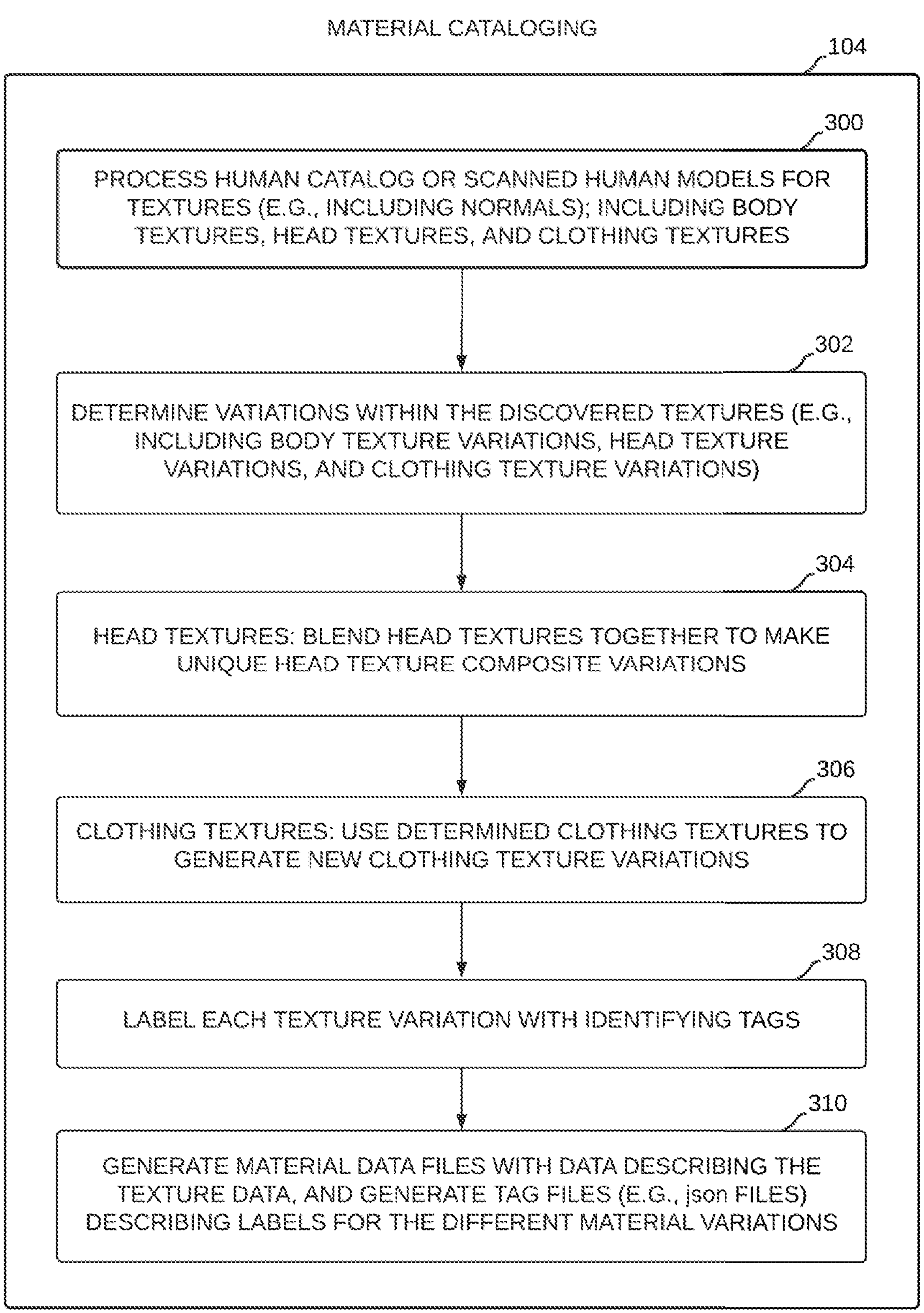
FIG. 3 is a schematic illustrating a flowchart for a method for material cataloging, in accordance with one embodiment.

FIG. 3 is a schematic illustrating a flowchart for a method for material cataloging, in accordance with one or more example embodiments. In accordance with an embodiment, the operations shown in FIG. 3 are included as part of human cataloging in operation 104 of FIG. 1.

At operation 300, a human catalog or scanned human models are processed for textures. The textures may include body textures (e.g., skin), head textures (e.g., faces), and clothing textures.

At operation 302, variations are determined within the discovered textures.

At operation 304, head textures are blended together to make unique head texture composite variations.

At operation 306, determined clothing textures (e.g., from operation 302) are used to generate new clothing texture variations.

At operation 308, each texture variation is labeled with identifying tags.

At operation 310, one or more material data files are generated with data describing the texture data and/or one or more tag files are generated with data describing labels for different material variations.

Figure 4A:
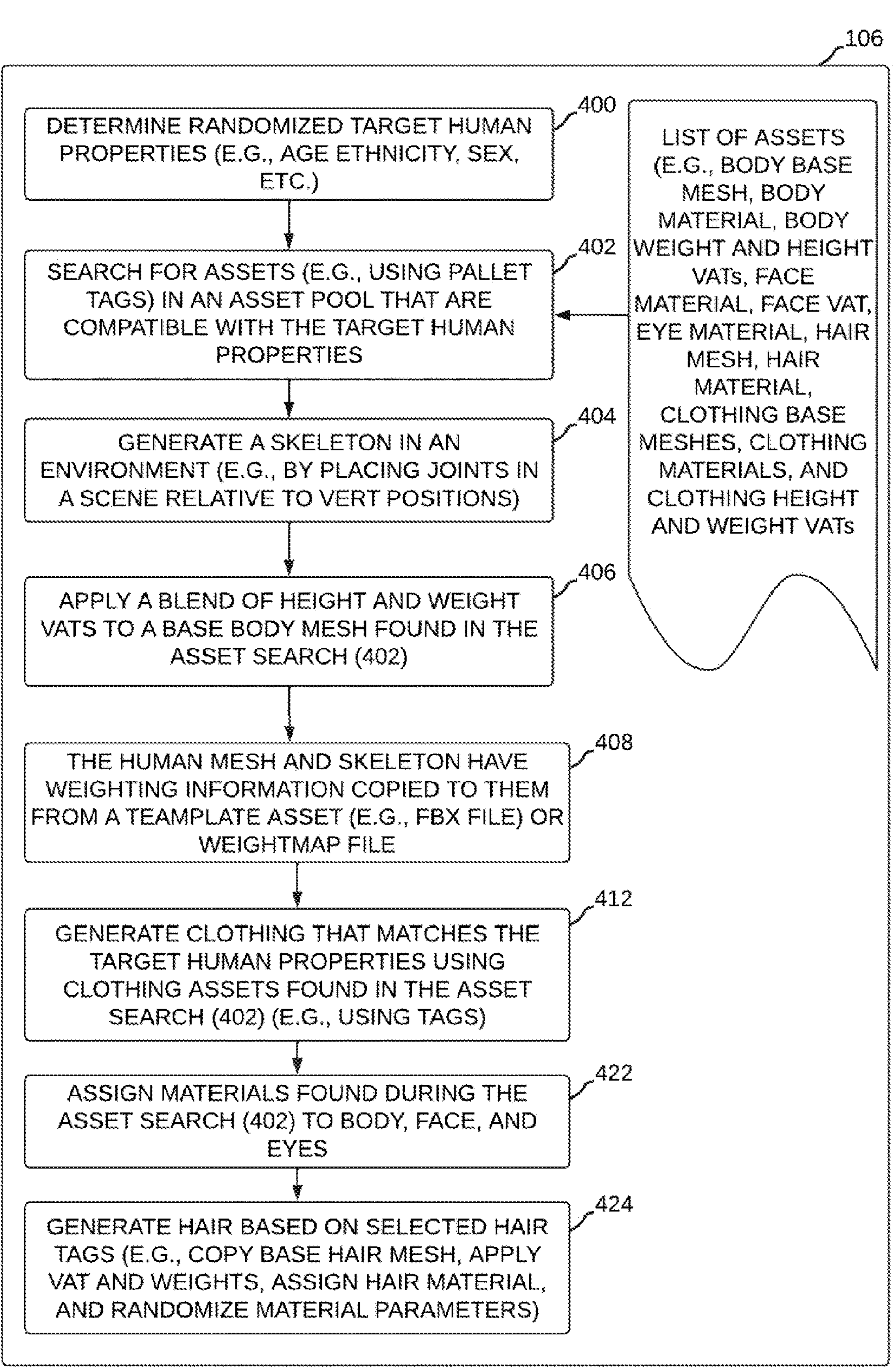
FIG. 4A is a schematic illustrating a flowchart for a method for generating an anonymized digital human, in accordance with one embodiment.

FIG. 4A is a schematic illustrating a flowchart for a method for generating an anonymized digital human, in accordance with one or more example embodiments.

At operation 400, randomized target human properties are determined.

At operation 402, a search is conducted for assets in an asset pool that are compatible with the determined target human properties.

At operation 404, a skeleton is generated in an environment.

At operation 406, a blend of height and weight VATs is applied to a base body mesh found in the search.

At operation 408, weighting information is copied to the human mesh and skeleton from a template. The skeleton and the human mesh may be linked to each other. The weighting information may include weight values assigned to a bone-vertex pair. The weight values may represent a strength of influence that a bone in the skeleton has over a movement of a specific vertex. For example, a weight value of 1 may mean that a bone fully controls a vertex, while lower values indicate less influence.

At operation 412, clothing that matches the target human properties are generated using clothing assets found in the search.

At operation 422, material found during the search are assigned to parts, such as the body, face, and/or eyes.

At operation 424, hair is generated based on selected hair tags.

Figure 4B:
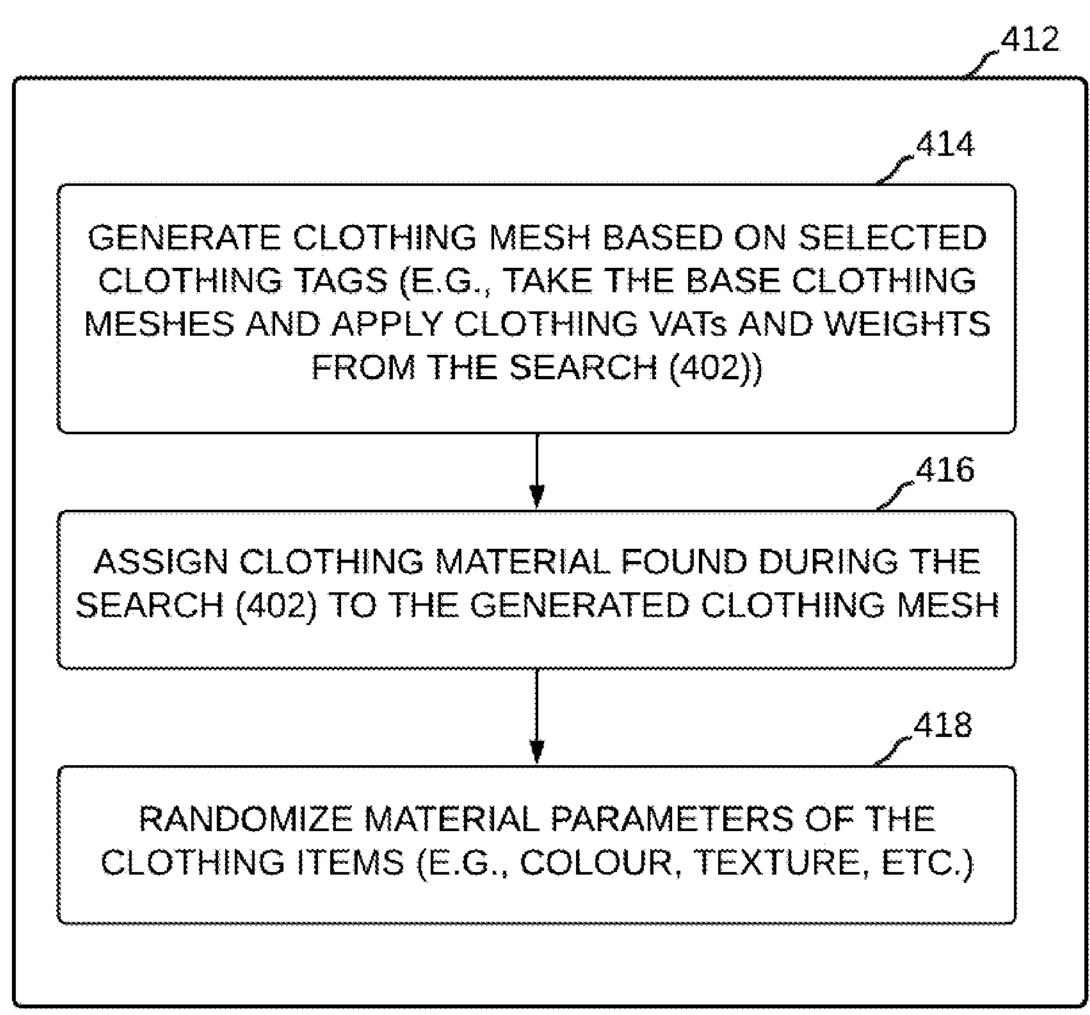
FIG. 4B is a schematic illustrating a flowchart for a method for generating clothing for an anonymized digital human, in accordance with one embodiment.

FIG. 4B is a schematic illustrating a flowchart for a method for generating clothing for an anonymized digital human, in accordance with one or more example embodiments. In accordance with an embodiment, the operations in FIG. 4B may be included as part of operation 412 of FIG. 4A.

At operation 414, a clothing mesh is generated based on selected clothing tags.

At operation 416, clothing material found during the search is assigned to the generated clothing mesh.

At operation 418, material parameters of the clothing items are randomized.

FIG. 5A, FIG. 5B, and FIG. 5C are schematic illustrations of example palette pipelines. In example embodiments shown in FIG. 5A, FIG. 5B, and FIG. 5C, the palette pipeline includes an authoring stage 500 in which a scan package 502 and/or a human download package is generated or accessed. The scan package 502 and human download package include data of scans of humans which may include geometry data including human digital geometry data, humanoid clothing geometry data, hair geometry data, head geometry data, and more. The geometry data may be in mesh format or in another form (e.g., point cloud data, volumetric data, parametric surfaces, and the like). The scan package 502 and human download package may include texture data including human texture data (e.g., skin), humanoid clothing texture data, hair texture data, head texture data, and more. In example embodiments, the palette pipeline includes an extraction stage 504, a generation and transformation stage 506, a preparation stage 510, processing stages 520 and 530, an exporting stage 540, a tagging stage 560 (which includes generation of a human body mesh pool with tags 564 from body base mesh tags file 562, hair VAT pool with tags 566, and clothing based mesh pool with tags 568), and an edit time stage 570. In example embodiments, the processing stage 530 includes Human Blendshape generator hda 532 and Tagging System 534. In example embodiments, the edit time stage 570 includes Human Generator 572 and In-Scene Human 574.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
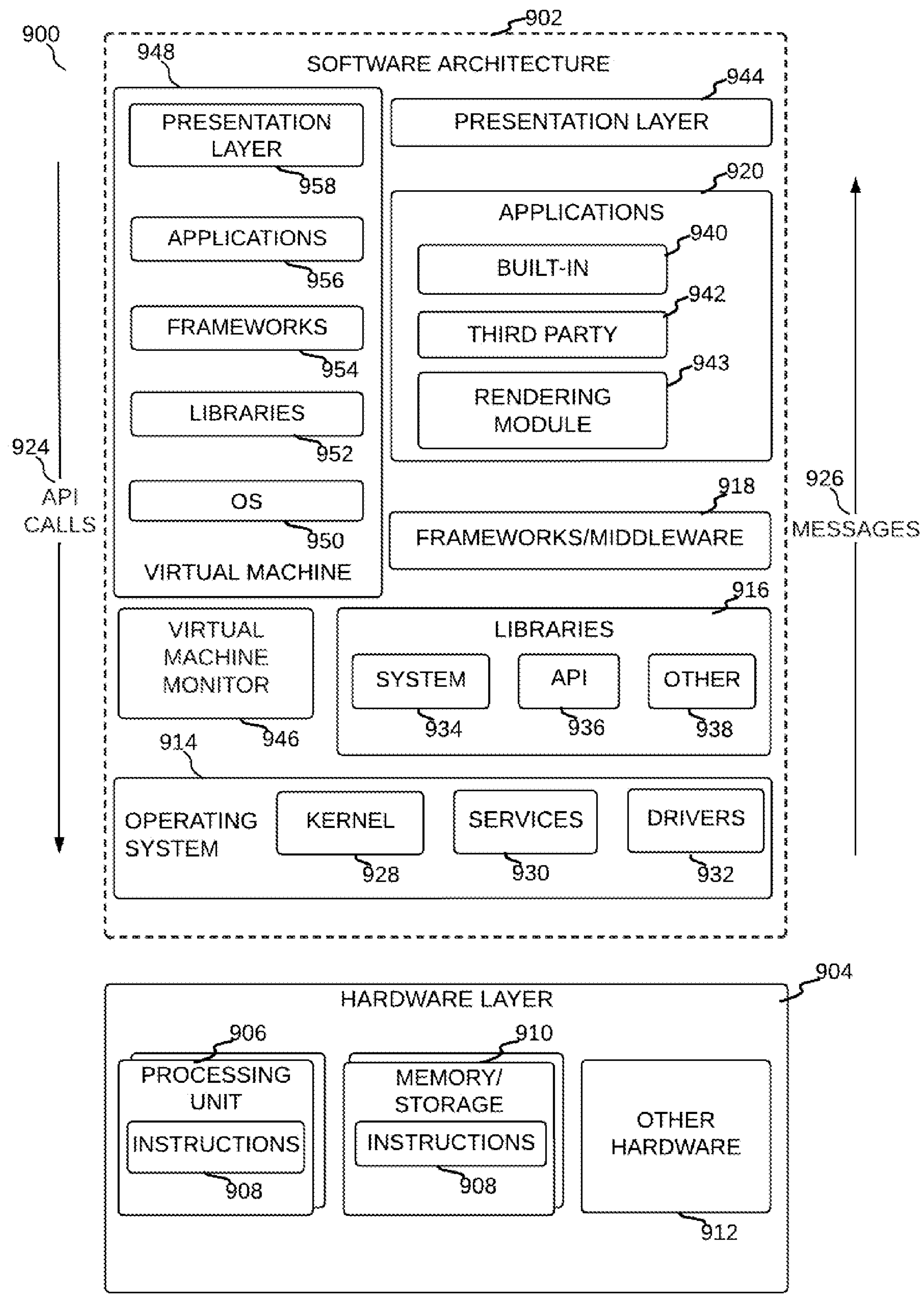
FIG. 9 is a block diagram illustrating an example software architecture, which may be used in conjunction with various hardware architectures described herein.

FIG. 9 is a block diagram 900 illustrating an example software architecture 902, which may be used in conjunction with various hardware architectures herein described to provide a gaming engine 901 and/or components of the rendering engine. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 having associated executable instructions 908. The executable instructions 908 represent the executable instructions of the software architecture 902, including implementation of the methods, modules and so forth described herein. The hardware layer 904 also includes memory/storage 910, which also includes the executable instructions 908. The hardware layer 904 may also comprise other hardware 912.

In the example architecture of FIG. 9, the software architecture 902 may be conceptualized as a stack of layers where each layer provides particular functionality. For example, the software architecture 902 may include layers such as an operating system 914, libraries 916, frameworks or middleware 918, applications 920 and a presentation layer 944. Operationally, the applications 920 and/or other components within the layers may invoke application programming interface (API) calls 924 through the software stack and receive a response as messages 926. The layers illustrated are representative in nature and not all software architectures have all layers. For example, some mobile or special purpose operating systems may not provide the frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be used by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) provide a higher-level common infrastructure that may be used by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 942 may invoke the API calls 924 provided by the mobile operating system such as operating system 914 to facilitate functionality described herein. In example embodiments, the applications 920 may include a rendering module 943. In example embodiments, any of the operations described herein, such as the operations described with respect to FIGS. 1-5, may be implemented by the rendering module 943.

The applications 920 may use built-in operating system functions (e.g., kernel 928, services 930 and/or drivers 932), libraries 916, or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures use virtual machines. In the example of FIG. 9, this is illustrated by a virtual machine 948. The virtual machine 948 creates a software environment where applications/modules can execute as if they were executing on a hardware machine (such as the machine 1000 of FIG. 10, for example). The virtual machine 948 is hosted by a host operating system (e.g., operating system 914) and typically, although not always, has a virtual machine monitor 946, which manages the operation of the virtual machine 948 as well as the interface with the host operating system (i.e., operating system 914). A software architecture executes within the virtual machine 948 such as an operating system (OS) 950, libraries 952, frameworks 954, applications 956, and/or a presentation layer 958. These layers of software architecture executing within the virtual machine 948 can be the same as corresponding layers previously described or may be different.

Figure 10:
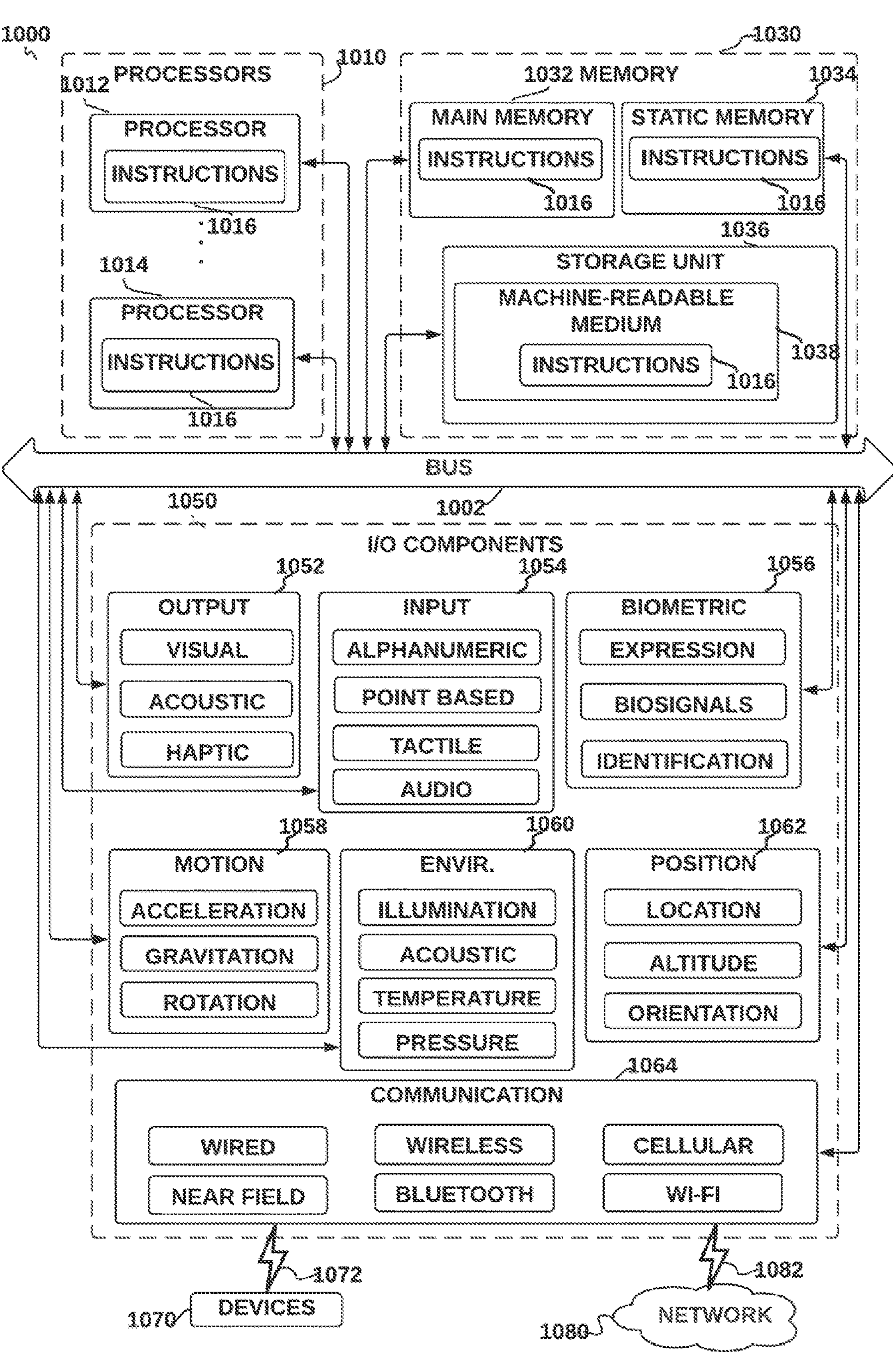
FIG. 10 is a block diagram illustrating components of a machine, according to some example embodiments, configured to read instructions from a machine-readable medium (e.g., a machine-readable storage medium) and perform any one or more of the methodologies discussed herein.

FIG. 10 is a block diagram illustrating components of a machine 1000, according to some example embodiments, configured to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. As such, the instructions 1016 may be used to implement modules or components described herein. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines that individually or jointly execute the instructions 1016 to perform any one or more of the methodologies discussed herein.

The machine 1000 may include processors 1010, memory 1030, and input/output (I/O) components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory, such as a main memory 1032, a static memory 1034, or other memory, and a storage unit 1036, both accessible to the processors 1010 such as via the bus 1002. The storage unit 1036 and memory 1032, 1034 store the instructions 1016 embodying any one or more of the methodologies or functions described herein. The instructions 1016 may also reside, completely or partially, within the memory 1032, 1034, within the storage unit 1036, within at least one of the processors 1010 (e.g., within the processor's cache memory), or any suitable combination thereof, during execution thereof by the machine 1000. Accordingly, the memory 1032, 1034, the storage unit 1036, and the memory of processors 1010 are examples of machine-readable media 1038.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1050 may include a wide variety of components to receive input, provide output, produce output, transmit information, exchange information, capture measurements, and so on. The specific input/output (I/O) components 1050 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1050 may include many other components that are not shown in FIG. 10. The input/output (I/O) components 1050 are grouped according to functionality merely for simplifying the following discussion and the grouping is in no way limiting. In various example embodiments, the input/output (I/O) components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1062 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1062, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
- one or more computer processors;
- one or more computer memories;
- a set of instructions incorporated into the one or more computer memories, the set of instructions configuring the one or more computer processors to perform operations, the operations comprising:
- randomly determining one or more values for one or more target human properties;
- searching for assets in an asset pool that are compatible with the one or more values, the assets including a human body mesh;
- applying a blend of height and weight vertex animation textures (VATs) to the human body mesh, wherein the VATs compress delta positions of vertices in the human body mesh between height and weight variations under RGBA values in an image format; and
- placing the blended human body mesh into a digital environment.

2. The system of claim 1, the operations further comprising:
- associating a skeleton to the human body mesh; and
- using weighting information to associate bones within the skeleton to the vertices in the human body mesh.

3. The system of claim 1, the operations further comprising:
- generating a clothing mesh for the human body mesh based on selected clothing tags;
- assigning a clothing material found during the searching to the generated clothing mesh; and
- randomizing one or more parameters of the assigned clothing material.

4. The system of claim 1, the operations further comprising assigning materials found during the asset search to body, face, and eyes corresponding to the human body mesh.

5. The system of claim 1, the operations further comprising:
- generating a hair mesh for the human body mesh based on selected hair tags;
- assigning a hair material found during the searching to the generated hair mesh; and
- randomizing one or more parameters of the assigned hair material.

6. The system of claim 1, wherein the blend of height and weight VATs include one or more unique composite texture variations generated from blending of textures scanned from human models.

7. The system of claim 1, wherein the blend of height and weight VATs include geometry scanned from human models.

8. A method comprising:
- randomly determining one or more values for one or more target human properties;
- searching for assets in an asset pool that are compatible with the one or more values, the assets including a human body mesh;
- applying a blend of height and weight vertex animation textures (VATs) to the human body mesh, wherein the VATs compress delta positions of vertices in the human body mesh between height and weight variations under RGBA values in an image format; and
- placing the blended human body mesh into a digital environment.

9. The method of claim 8, further comprising:
- associating a skeleton to the human body mesh; and
- using weighting information to associate bones within the skeleton to the vertices in the human body mesh.

10. The method of claim 8, further comprising:
- generating a clothing mesh for the human body mesh based on selected clothing tags;
- assigning a clothing material found during the searching to the generated clothing mesh; and
- randomizing one or more parameters of the assigned clothing material.

11. The method of claim 8, further comprising assigning materials found during the asset search to body, face, and eyes corresponding to the human body mesh.

12. The method of claim 8, further comprising:
- generating a hair mesh for the human body mesh based on selected hair tags;
- assigning a hair material found during the searching to the generated hair mesh; and
- randomizing one or more parameters of the assigned hair material.

13. The method of claim 8, wherein the blend of height and weight VATs include one or more unique composite texture variations generated from blending of textures scanned from human models.

14. The method of claim 8, wherein the blend of height and weight VATs include geometry scanned from human models.

15. A non-transitory computer-readable storage medium storing a set of instructions that, when executed by one or more computer processors, causes the one or more computer processors to perform operations, the operations comprising:

randomly determining one or more values for one or more target human properties;

searching for assets in an asset pool that are compatible with the one or more values, the assets including a human body mesh;

applying a blend of height and weight vertex animation textures (VATs) to the human body mesh, wherein the VATs compress delta positions of vertices in the human body mesh between height and weight variations under RGBA values in an image format; and placing the blended human body mesh into a digital environment.

16. The non-transitory computer-readable storage medium of claim 15, the operations further comprising:

associating a skeleton to the human body mesh; and using weighting information to associate bones within the skeleton to the vertices in the human body mesh.

17. The non-transitory computer-readable storage medium of claim 15, the operations further comprising:

generating a clothing mesh for the human body mesh based on selected clothing tags;

assigning a clothing material found during the searching to the generated clothing mesh; and randomizing one or more parameters of the assigned clothing material.

18. The non-transitory computer-readable storage medium of claim 15, the operations further comprising assigning materials found during the asset search to body, face, and eyes corresponding to the human body mesh.

19. The non-transitory computer-readable storage medium of claim 15, the operations further comprising:

generating a hair mesh for the human body mesh based on selected hair tags;

assigning a hair material found during the searching to the generated hair mesh; and randomizing one or more parameters of the assigned hair material.

20. The non-transitory computer-readable storage medium of claim 15, wherein the blend of height and weight VATs include one or more unique composite texture variations generated from blending of textures scanned from human models.

* * * * *